United States Patent
Laitinen et al.

(10) Patent No.: US 8,626,708 B2
(45) Date of Patent: *Jan. 7, 2014

(54) MANAGEMENT OF USER DATA

(75) Inventors: Pekka Laitinen, Helsinki (FI); Silke Holtmanns, Vantaa (FI)

(73) Assignee: Nokia Corporation, Espoo (FI)

( * ) Notice: Subject to any disclaimer, the term of this patent is extended or adjusted under 35 U.S.C. 154(b) by 175 days.

This patent is subject to a terminal disclaimer.

(21) Appl. No.: 11/248,139

(22) Filed: Oct. 13, 2005

(65) Prior Publication Data

US 2007/0050365 A1     Mar. 1, 2007

(30) Foreign Application Priority Data

Aug. 25, 2005   (FI) ..................... 20050853

(51) Int. Cl.
*G06F 7/00*     (2006.01)
*G06F 17/00*    (2006.01)

(52) U.S. Cl.
USPC .......... 707/611; 707/617; 707/618; 707/620; 707/624; 707/626

(58) Field of Classification Search
USPC ............ 707/9, 1, 10, 999.1; 463/25; 455/445; 709/201; 726/3, 4, 6
See application file for complete search history.

(56) References Cited

U.S. PATENT DOCUMENTS

| 5,414,752 | A * | 5/1995 | Jonsson | 455/445 |
|---|---|---|---|---|
| 2001/0049613 | A1* | 12/2001 | Gramann et al. | 705/5 |
| 2005/0102501 | A1 | 5/2005 | Haukka et al. | |
| 2007/0060306 | A1* | 3/2007 | Amaitis et al. | 463/25 |

FOREIGN PATENT DOCUMENTS

| GB | 2411542 | 8/2005 |
|---|---|---|
| WO | WO 2004/040842 | 5/2004 |
| WO | 2005/046163 | 5/2005 |

OTHER PUBLICATIONS

3GPP TS 33.220 V1.0.0, Dec. 2003.*
3GPP TSG SA WG3 Security—S2#27 S2-030072, Feb. 25-28, 2003.*
3GPP Shenzhen, China, 3GPP TSG SA WG3 Security—SA3#36, Nov. 23-26, 2004.*
3rd Generation Partnership Project, 3GPP TS 33.220 V6.3.0 (Dec. 2004).*
3 GPP—ETSI TS 133 220 V6.3.0, "Universal Mobile Telecommunications System (UMTS); Generic Authentication Architecture (GAA); Generic bootstrapping architecture", Dec. 2004, pp. 1-38.
International Search Report for International Application No. PCT/IB2006/002260, filed Aug. 9, 2006.
International Search Report dated May 23, 2007 for International Application No. PCT/IB2007/000189.

* cited by examiner

*Primary Examiner* — Usmaan Saeed
*Assistant Examiner* — Yu Zhao
(74) *Attorney, Agent, or Firm* — Mintz, Levin, Cohn, Ferris, Glovsky & Popeo, P.C.

(57) ABSTRACT

A method and arrangements for managing user data stored in a database of a communications system where the database is managed by a main controller is disclosed. In the method a user is first authenticated, where after an application entity can manage user data in the database that associates with the user and an application by communicating data between the application entity and a second entity connected to the communications system.

36 Claims, 5 Drawing Sheets

MANAGEMENT OF USER DATA

BACKGROUND OF THE INVENTION

1. Field of the Invention

The present disclosure relates to authentication in a communications system, and more particularly, but not exclusively, to management of user security data.

2. Description of the Related Art

A communication system can be seen as a facility that enables communication sessions between entities such as user equipment and/or other nodes associated with the communication system. The communication may comprise, for example, communication of voice, data, multimedia and so on. An user equipment connected to a communication system may, for example, be provided with a two-way telephone call or multi-way conference call or with a data connection. In addition voice call services, various other services, for example enhanced content services such as multimedia services or other data services, may be provided for a user. An user equipment may communicate data to and from a server entity, or between two or more user equipments.

A communication system typically operates in accordance with a given standard or specification, which sets out what the various entities associated with the system are permitted to do and how that should be achieved. Communication protocols, parameters, reference points and interfaces, which shall be used for a connection are typically defined by the standards or specifications.

Communication systems proving wireless communication for user equipment are known. These systems are commonly referred to as mobile systems, although in certain systems the mobility may be restricted to substantially small areas. An example of the mobile systems is the public land mobile network (PLMN). Another example is a mobile system that is based, at least partially, on use of communication satellites. Mobile communications may also be provided by means of other types of systems, such as by means of wireless local area networks (WLAN) or Wide Area Networks (WAN).

In a wireless system an access node provides user equipment with access to the communication system. An user equipment may be in wireless communication with two or more access nodes at the same time. Communication on the wireless interface between the user equipment and the access node(s) can be based on an appropriate communication protocol. Examples of the various wireless access systems include the CDMA (Code Division Multiple Access), WCDMA (Wide-band CDMA), TDMA (Time Division Multiple Access), FDMA (Frequency Division Multiple Access), or SDMA (Space Division Multiple Access), Institute of Electrical and Electronics Engineers (IEEE) 802.11 and further developments and hybrids thereof.

The operation of the network apparatus is controlled by an appropriate control arrangement commonly including a number of various control entities. One or more gateways or intermediate servers may also be provided for connecting a network to other networks or hiding network internal details from external nodes. For example, a PLMN network may be connected to other mobile or fixed line communication networks or data communication networks such as an IP (Internet Protocol) and/or other packet data networks.

A user or the user equipment may need to be authenticated before he/she is allowed to access or otherwise use various applications and services. This may be required for security and privacy reasons, but also to enable correct billing of the service usage. For example, it may need to be verified that the user is whoever he/she claims to be, that the user has the right to use a certain service, that the user can be provided with an access to sensitive information and so on. In an authentication, a user can be identified based on various identifiers.

Various authentication mechanisms are already in place, or have been proposed. A non-limiting example is an authentication mechanism proposed by the third generation partnership project (3GPP) called the 'Generic Authentication Architecture' (GAA). The GAA is indented to be used as a security procedure for various applications and services for users of mobile user equipment, such as mobile stations for cellular systems. The GAA is intended to be based on secret user identities that are stored on specific secure storage entities provided in association with the user equipment and subscriber databases. The secure storage entity of a user equipment may be provided by an appropriate security function, for example a security module, an identification module or a trusted platform. The subscriber database may be provided by an appropriate network entity, for example a Home Location Register (HLR) or Home Subscriber Server (HSS). Typically user data for each user is stored in a user profile. The secure user identity storage entities and the subscriber database entities have been controlled by the operators who issue the user identities and who typically run and own the subscriber databases.

However, proposals for the authentication systems, such as the GAA, are based on subscriber databases that are under direct control of and manageable only by the operators. Operators are also assumed to have specific management arrangements of their own. User data, for example user security settings cannot be managed by other parties, for example service applications or other network application functions (NAFs) residing for example in trusted third party networks.

The management by other parties might, nevertheless, be desirable in certain occasions. For example, the burden to manage a subscriber database by non-standardized operator specific arrangements might become substantial, and an operator may not be prepared or even have the capability to take responsibility of the management. This situation can be exemplified with reference to application functions that also provide services such as those called Liberty Alliance Identity Provider services. A possibility to allow trusted third parties, for example partner operators, to update user security data in an operator database using for example GAA specific protocols might ease the maintenance burden of the operator for frequent management activities. Because of the unpredictability in the number and type of services and/or service provides the operators may not always have the resources to manage the subscriber databases in all occasions.

It is noted that the problem is not limited to wireless systems, but may occur in any communication environment wherein the user may access services and applications by user equipment.

SUMMARY OF THE INVENTION

Embodiments of the present invention aim to address one or several of the above problems.

According to one embodiment, there is provided a method for managing user data stored in a database of a communications system where the database is managed by a main controller. In the method a user is first authenticated, where after an application entity can manage user data in the database that associates with the user and an application by communicating data between the application entity and a second entity connected to the communications system.

According to another embodiment, there is provided a node for a communications system where user data is stored in a database managed by a main controller. The node is configured to provide an application to an authenticated user. The node is further configured to manage user data associated with the authenticated user and the application in the database by communicating data to a second entity connected to the communications system.

According to another embodiment, there is provided a security management entity for a communications system where user data is stored in a database managed by a main controller. The security management entity is configured for generating at least one authentication parameter for authentication of a user for enabling the user to use an application. It is also configured for managing, based on data received from the application entity, user data associated with the user and the application in the database by communicating data to the database.

According to another embodiment, there is provided a user database for a communications system. The database is configured for management by a main controller. The user database is further configured so as to enable management of user data associated with an authenticated user and an application provided by an application entity based on data communicated from at least one of the application entity and a security management function.

According to yet another embodiment, there is provided a system for managing data in a user database of a communications system where the database is managed by a main controller. The system is configured for authenticating a user for enabling the user to use an application provided by an application entity. The system is further configured for managing user data associated with the user and the application in a database of a communications system by communicating data to a second entity connected to the communications system.

In a more specific embodiment the management occurs in a phased manner, for example such that managing user data comprises modifying user data in a second database, communicating data from the second database to the database managed by the main controller, and only then modifying user data in the database managed by the main controller based on said data from the second database. The step of communicating data may occur in response to a predefined event.

Data for management of the user data may be comprises communicated between the application entity and a security management function. User data may be modified by the security management function. Alternatively, data may be communicated on an interface directly connecting the application entity and the user database.

Management may be applied to the user data by a remote entity when a user starts using a new service application.

The user may the authenticated in a generic authentication architecture in accordance with specifications of the third generation partnership project.

The user data may comprises user security data, for example user security settings or service specific user security settings of a generic bootstrapping architecture user security settings.

Information regarding a user database to be managed in a communications system comprising a plurality of user databases may be fetched from an appropriate location. For example, such information may be fetched from a subscriber locator function to a security management function.

The embodiments may provide advantage in that management of data in a subscriber database is made easier. The operator of a network may not need to manage user data through operator specific or offline management means and arrangements in all occasions.

BRIEF DESCRIPTION OF DRAWINGS

For better understanding of the present invention, reference will now be made by way of example to the accompanying drawings in which.

DETAILED DESCRIPTION OF THE PREFERRED EMBODIMENTS

Some exemplifying and non-limiting embodiments of the invention are discussed below with reference to a mobile communication network such as a public landline mobile network (PLMN). Before explaining these in more detail, a communication system comprising at least a PLMN is briefly explained with reference to FIG. 1.

Figure 1:
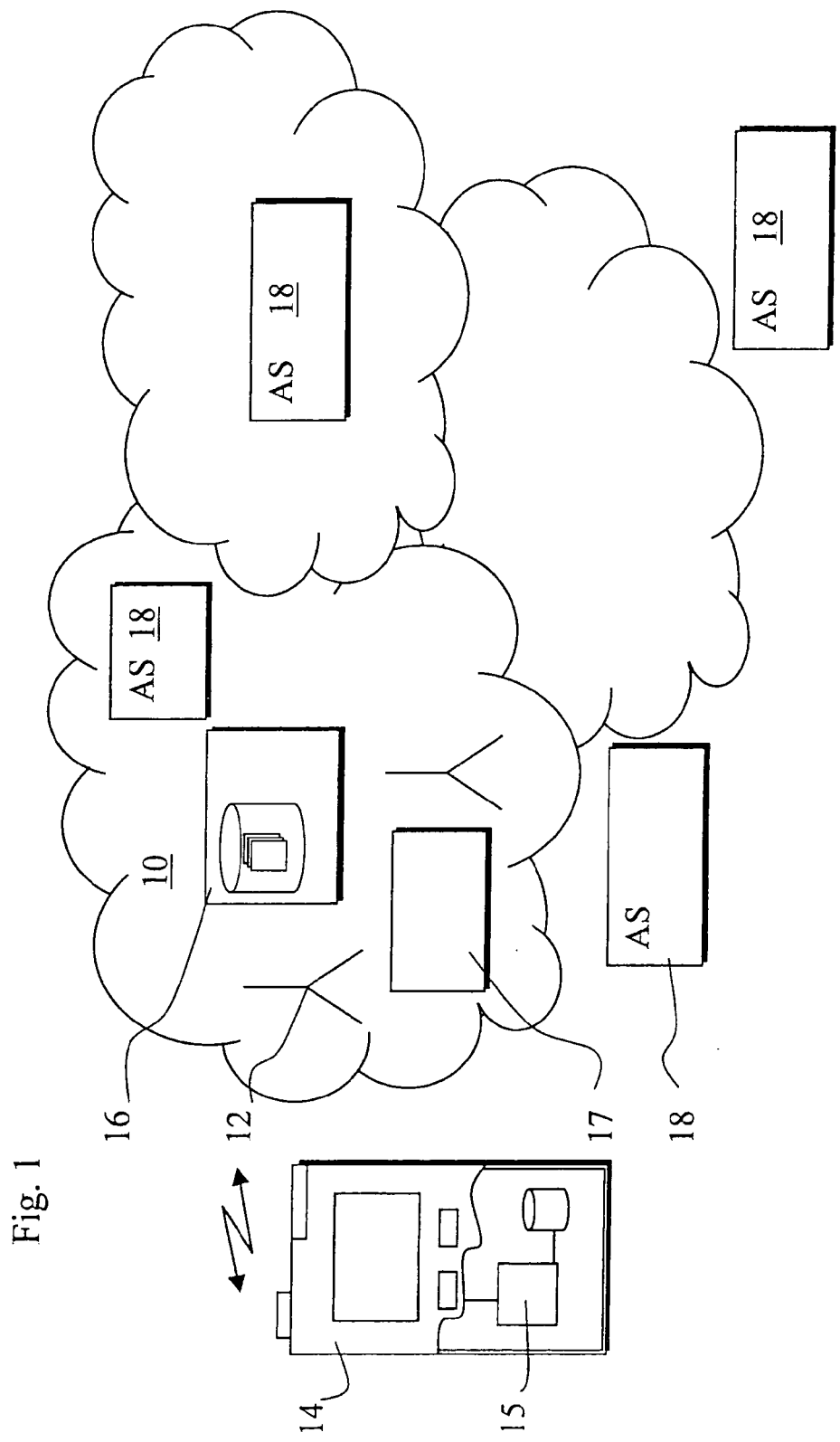
FIG. 1 shows a communication system wherein the present invention may be embodied.

In a PLMN 10 a number of base stations 12 is arranged to wirelessly transmit signals to and receive signals from a plurality of mobile user equipment. Likewise, an mobile user equipment 14 is able to transmit wireless signals to and receive signals from base stations. The operation of the network 10 is typically controlled by means of appropriate controller entities. Data required for the operation of the PLMN is typically stored in appropriate data storage entities. FIG. 1 shows only a data storage 16 configured to store subscriber i.e. user data. Non-limiting examples of such data storages include various home location registers (HLR) and home subscriber servers (HSS).

The user equipment (UE) 14 can be provided by any appropriate user terminal. The user equipment may contain or have access to a secure environment. In a mobile communications system, the user equipment constitutes a mobile terminal, for example a mobile telephone, a personal digital assistant (PDA) or a mobile PC (personal computer), or the like. For use in a wireless communications system, the user equipment comprises receive and transmit circuitry and means for receiving and transmitting wireless signals for implementing calls and other signaling channels so that it is enabled to communicate with the base stations 12, for example to make voice call and to send and receive data. The user equipment may also be enabled to process control instructions it may receive from the network and to send control information to the network.

A user may access various applications, for example service applications via the network he or she has access to. An application may be provided by a provider entity, for example any of service provider application servers 18. It is noted that the application servers (AS) need only be connected to the mobile network, but are not necessarily a part of the mobile network. This means that the operator of the network 10 may not necessarily have any or may only have a limited control on the operation of an application provider. Furthermore, a communication system may be provided by a plurality of different communication networks. Thus the application provider entity may be connected to another network than the network the user subscribes to.

A user or the user equipment commonly needs to be authenticated before he/she is allowed to access or otherwise use various applications and services via the network. FIG. 1 shows a security management server 17 adapted for user authentication. The security management server may be capable of key generation. For example, the server 17 may provide a bootstrapping function.

A user can be identified by the security management server 17 based on various identifiers. These can be divided into public and private or secret identifiers. The secret identifiers are typically only known by the operator whereas the public identifiers may be made public. Non-limiting examples of secret user identities include International Mobile Subscriber Identity (IMSI) and Internet Protocol Multimedia Private Identity (IMPI). Non-limiting examples of public identities include Mobile Subscriber Integrated System Digital Number (MSISDN) and IP Multimedia Public Identity (IMPU).

To maintain the identity information a mobile user equipment may be provided with an identity module 15. The identity module is commonly understood to refer to a storage of a secure identifier that is arranged to enable the networks to ensure that the user and the user equipment are who they claim to be. A user identity module may contain a number of security and other applications. Well-known non-limiting examples of user identity modules are the Subscriber Identity Module (SIM) of the 2G GSM and User Identity Circuit Card (UICC) of the 3G systems or trusted platforms. The user identity module might reside directly in the access device or be accessible from the user equipment providing the network access. User identity modules and the subscriber data storage of the network may store user identities and other shared secrets. A user may have several kinds of user identities that are stored in a user identity module and the subscriber data storage. For example, an IP Multimedia Private Identity (IMPI) may be used inside a security domain whereas a set of IMPUs (IM PUblic Identities) may be used outside the security domain. A user identity module may hold shared secrets with the subscriber data storage and generate security keys from the shared secret. These keys may then be used in creation of trusted connections between the user equipment and an application in operations such as bootstrapping.

Figure 2:
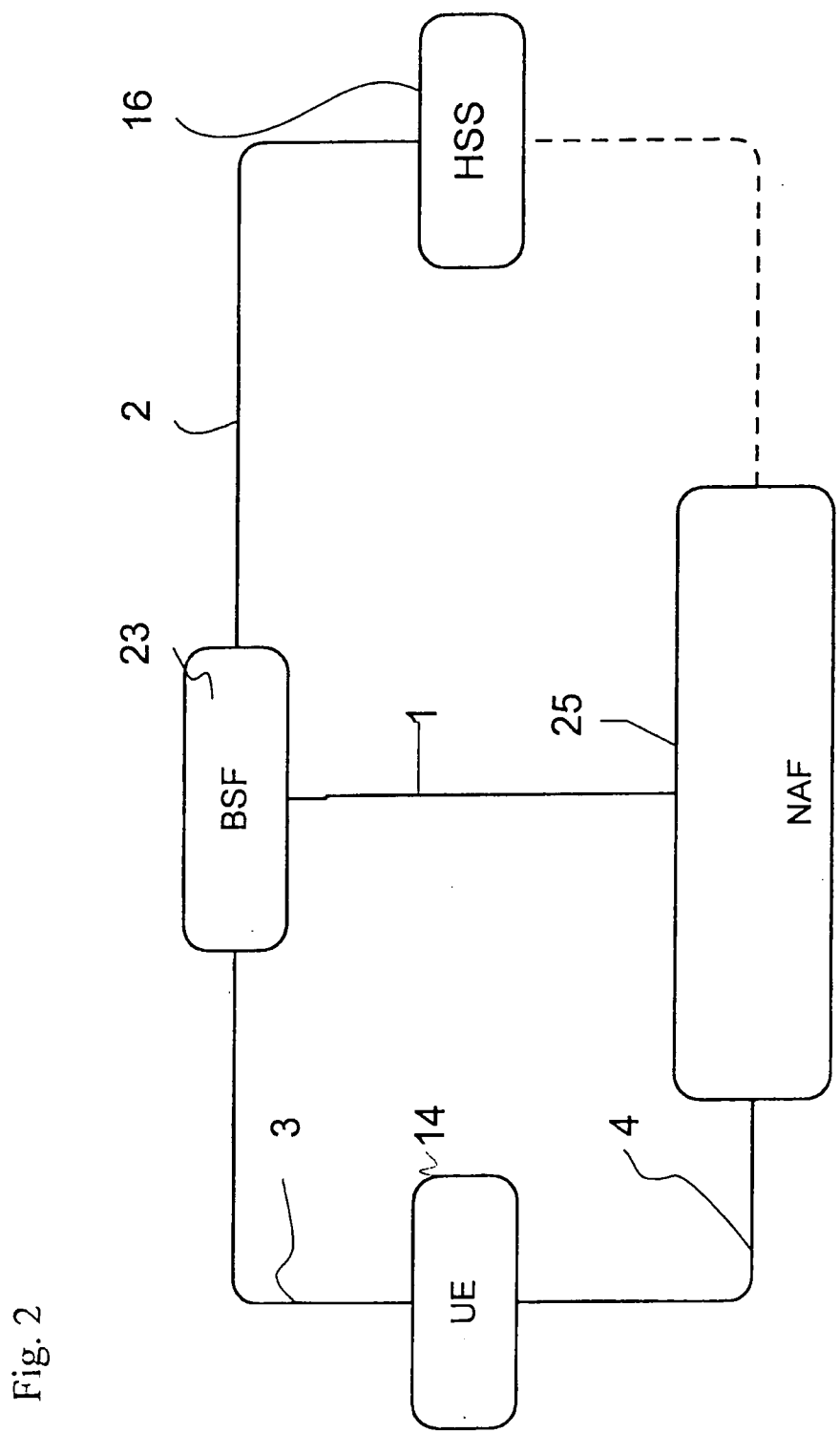
FIG. 2 shows the architecture of an existing authentication and key distribution mechanism.

FIG. 2 shows an example of an authentication mechanism 20 that has been proposed. More particularly, FIG. 2 is a schematic block diagram of an arrangement known as a generic authentication architecture (GAA) in accordance with the 3GPP system. The GAA is based on secret user identities that are stored on appropriate user identity modules 15 on the user equipment 14 and subscriber databases 16 on the network side. The GAA security domain may comprise a bootstrapping function (BSF) 23 which will be described in more detail below.

The exemplifying embodiments of the present invention will be described with reference to the GAA architecture as discussed in more detail below. Various possible components thereof will be described only briefly as the operation of these is not essential for embodying the invention.

The user equipment 14 may communicate with an application entity, for example a network application function (NAF) 25 over an appropriate interface 4, for example a Ua interface. The application function 25 is accessible by the user equipment 14 but before the application function can deliver its services to the user equipment 14 an authentication procedure may be needed. To enable this, the user equipment 14 can also communicate over an appropriate interface 3, for example a Ub interface, with the bootstrapping function (BSF) 23. The bootstrapping function 23 may communicate with a user database, such as a home subscriber server (HSS) 16 over an appropriate interface 2, for example a Zh interface. The bootstrapping function 23 may also communicate with the application function 25 over an appropriate interface 1, for example a Zn interface When the user equipment 14 wishes to access an application function 25 and has not undergone an authentication before that resulted authentication key material that is still valid, the user equipment may undergo an authentication procedure by dispatching a mobile user identity to the bootstrapping function 23 over interface 3. The bootstrapping function 23 can be in communication with the application function 25 over interface 1 to allow it to communicate the results of the authentication and the resulting authentication key material to the application function 25. Authentication using the identities originated from the mobile network can be implemented at the bootstrapping function 23 in various manners. The application function 25 may then utilize the received authentication key material for direct authentication of the user via a Ua reference point.

In a possible architecture of GAA, the home subscriber server (HSS) 16 contains security related information about all the users related to all the services that use the GAA or the Generic Bootstrapping Architecture (GBA). This information may be stored in GBA user security settings (GUSS). GUSS provides a set of user security settings for a user. The set may include all security settings of the user.

A new subscriber that has not used a service hosted by a network application function before may need to accomplish an initial service registration that results in the creation of user security settings. The service registration may be required before the new subscriber can start to use the service. However, these initial service registrations can become a too burdensome task for the operators since there has been no mechanism to perform these registrations automatically. In the following specific examples are given how an application, for example a network application function, that is hosting a service may also handle an initial registration of a user and to register the initial service parameters for example as a new service specific user security settings (USS) in the GBA user security settings (GUSS) of the subscriber in the HSS.

Figure 3:
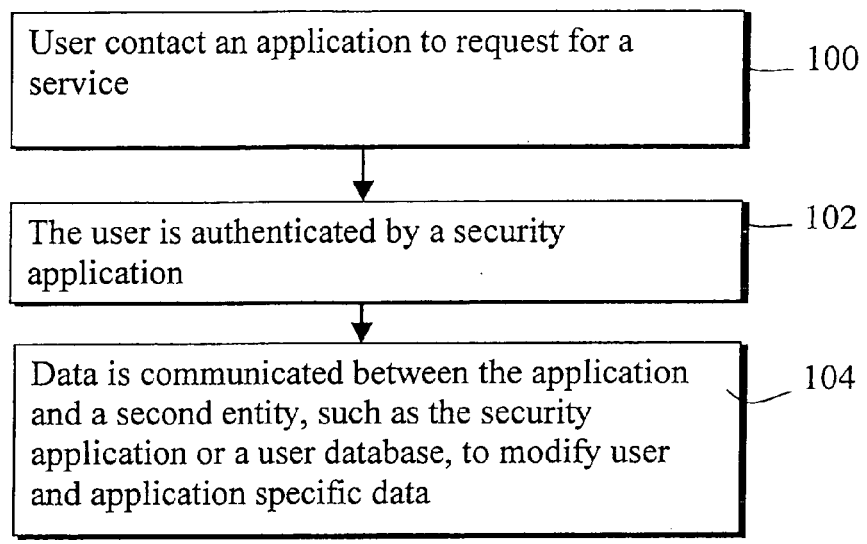
FIG. 3 is a flowchart illustrating an embodiment of the present invention.

The flowchart of FIG. 3 shows some general steps that may be taken in accordance with an embodiment for modifying by an application function user data in a user database that is controlled by a controlling party, for example a network operator. The modification may comprise operations such as insertion, updating, and deletion of information stored in the user database. In step 100 a user accesses an application entity to request for an application. The application may be invoked in response to a service request, or otherwise, for example by a timer. The authenticity of the user is then verified at step 102. The authentication may be based for example on GBA key material communicated between an application server and a user equipment, or based on a new run of GBA that authenticates the user via mobile credentials where after the application server receives the authentication result. User data stored in the database may then be managed in 104 by communicating data between the application entity and a second entity connected to the communications system without involvement of the controlling party.

The second entity may be a security application such as a bootstrapping function.

In accordance with a possibility the second entity comprises the user database, and the application entity may communicate directly with it via an appropriate interface.

The management may be handled in phased fashion such that management operation are first handled locally in the application entity or the security application and updated or otherwise modified data is then communicated to the user database in a later phase, and data in the user database is modified based on this data.

Management of user data requires identification of the user. To provide this, the management procedure may include assignment of a user identifier or a pseudonym that can be used identity the user in the subsequent sessions with the application server. In order to the GAA to support the initial service registration functionality, the network application function may need to be able to insert the newly created pseudonym to the GBA user security settings (GUSS) profile of a user, i.e., to the service specific user security settings (USS) in the HSS. The next time the subscriber attempts to authenticate itself towards the network application function a service specific USS may contain the pseudonym for the network application function so that it is possible to discover who the actual user is and what his related security settings are.

A network operator may allow only selected application functions to perform the changes for managing user data. For example, only such application functions that are fully trusted and have sufficient number of users to manage may be allowed to manage the user data.

An authorized application function may be provided with the capability of managing service specific user security settings belonging to that application function in the HSS by means of a security management server. In the following specific examples it is assumed that the user has already been bootstrapped with a bootstrapping function (BSF) to create some NAF specific key material and that this key material is still valid before the management operations take place. The communication between NAF and BSF may be performed in a secure communication channel, for example using HTTPS (Hypertext Transport Protocol Security), MAP/Sec (Mobile Application Part Security) or IPSec (Internet Protocol Security).

Figure 4:
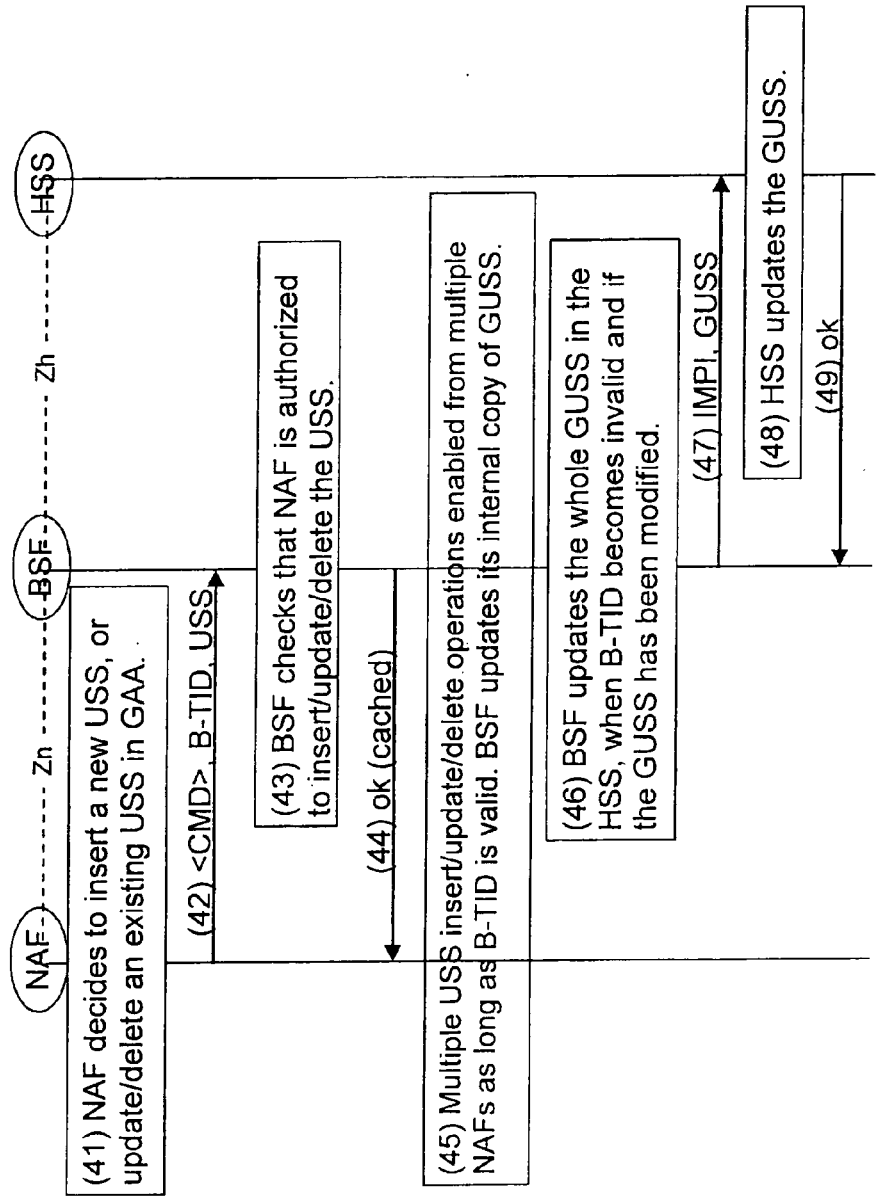
FIGS. 4 and 5 show exemplifying specific embodiments.

An approach is to manage the subscriber database asynchronously through a bootstrapping function over appropriate interfaces, for example interfaces 1 and 2 of FIG. 2. FIG. 4 depicts messaging details related to the user data insert/update/delete procedure where the messaging between a network application function (NAF) through the bootstrapping function (BSF) and the home subscriber server (HSS) is asynchronous. It may be that the NAF is only authorized to perform some management procedure, but not others. For example, updating may be allowed whereas deleting is not.

The messaging between the NAF and the BSF, and the BSF and the HSS may take place in two phases such that in a first phase, during the lifetime of the bootstrapping temporary identifier (B-TID), different NAF servers may update the internal copy of the GUSS of a user in the BSF by inserting, updating, and deleting USSs (steps 41-44). A second phase may start when the B-TID becomes invalid (e.g., expires or is replaces by a new B-TID), in response to timer, or periodically. If one or more NAF servers have modified subscriber's GUSS or parts of it in the BSF, the BSF may then update the whole or part of the subscriber's GUSS in the HSS (steps 46-49).

The arrangement may be such that each NAF has the right to modify only certain parts of the GUSS data. The BSF may also only allow one NAF or certain NAFs at the time to modify the content of the GUSS data. The BSF may also restrict modifications to dedicated USS or may allow management actions for a larger set of USSs.

An advantage of employing a -multi-phased procedure is that since a NAF modifies only an internal copy of a GUSS stored in a BSF, this procedure may be substantially fast. Thus the number of modification messages going from the BSF to the HSS may be substantially small.

Turning now to some exemplifying management operations. An USS insert operation may be needed to modify user data after a NAF has fetched parameters, for example a key, from the BSF using the B-TID, and the user equipment and the NAF have completed the authentication between themselves. If the NAF has not received an USS from the BSF, or the received USS was empty meaning that the subscriber has not used the service before, a procedure for insertion of the USS may be needed to create the USS and place the created USS in the operators user database, for example a HSS or HLR. An example is a situation where a user roams and uses for the first time a service of the visited network operator.

In the example of FIG. 4 the NAF creates, at step 41, a new service specific USS for the subscriber and populates the data fields with subscriber specific data. The USS may contain a pseudonym created by the NAF and other service specific data required by the service specific USS. The NAF then sends at step 42 an INSERT message with the B-TID, and the new USS to the BSF over the Zn interface. The BSF may then check at step 43 that the NAF is authorized to insert the new USS to subscriber's GUSS. If the NAF is not authorized to perform this management action, the BSF may return an ERROR message to the NAF, or take some other appropriate action. If the NAF is authorized by to insert the new USS to subscriber's GUSS, the BSF inserts the USS to its internal copy of subscriber's GUSS, and returns at step 44 an OK message to the NAF.

Steps 41 to 44 may occur multiple times during the lifetime of the B-TID. For example, different NAFs may modify subscriber's GUSS at step 45.

When the B-TID and the corresponding bootstrapping session becomes invalid and if the BSF's internal copy of subscriber's GUSS has been modified (see step 46), the BSF may send the subscriber's IMPI and GUSS to the HSS at step 47. A complete GUSS or only the altered parts of the GUSS may be sent to the HSS at this stage. The HSS may then replace at step 48 the old GUSS with the modified GUSS received from the BSF or replace the modified parts. Subscriber's GUSS can be identified based on the IMPI. Upon successful replacement operation, an appropriate acknowledgement, such as an OK message, may be sent to the BSF at step 49.

If the replacement or modification operation was not successful, an ERROR message may be sent to the BSF. It is noted that from the point of view of the management operations, it does not matter how NAFs that have modified the GUSS are informed of the failure, or whether they need to be informed at all.

Asynchronous USS update operation will be explained next with reference to FIG. 4. As above, the NAF has fetched required parameters from the BSF using the B-TID, and the user equipment and the NAF have completed the authentication between themselves. If during the session the NAF discovers that subscriber's USS needs to be updated, the NAF may initiate at step 41 the modification of the existing service specific USS for the subscriber. The NAF then sends at step 42 an UPDATE message with the B-TID, and the updated USS to the BSF over the Zn interface. The BSF checks that the NAF is authorized to update the USS to subscriber's GUSS at step 43. As above, if the NAF is not authorized to perform the requested management operation, the BSF may return an ERROR message to the NAF. If the NAF is authorized to update the USS to subscriber's GUSS, the BSF updates the USS in its internal copy of subscriber's GUSS, and returns an OK message at step 44 to the NAF.

As with the insertion, update steps 41 to 44 may occur multiple times during the lifetime of the B-TID. Steps 45 to 49 can the same as described before with reference to insertion. After step 49, the USS in subscriber's GUSS in the HSS has been updated.

A further exemplifying embodiment of the asynchronous management relates to delete operations. It is again assumed that the NAF has already fetched required parameters from the BSF using the B-TID, and the user equipment and the NAF have completed the authentication between themselves. If the NAF discovers that the subscriber wants to terminate the service usage with it, and thus the subscriber's USS needs to be deleted from the GUSS, the NAF may initiate deletion of the existing service specific USS for the subscriber at step 41 of FIG. 4. The NAF may then send a DELETE message with the B-TID and the USS identifier, i.e., application-id to the BSF over Zn interface at step 42. The BSF checks at step 43 that the NAF is authorized to delete the USS to subscriber's GUSS. If the NAF is not authorized, the BSF may return an ERROR message to the NAF. If the NAF is authorized to delete the USS to subscriber's GUSS, the BSF removes the USS from its internal copy of subscriber's GUSS, and returns an OK message at step 44 to the NAF.

As above, steps 41 to 44 may occur multiple times during the lifetime of the B-TID. Steps 45 to 49 may be the same as described above. After step 49, the USS in subscriber's GUSS in the HSS has been deleted. In all three management procedures one or more USS or even the whole GUSS may be managed by a NAF. The user data may associate with other applications. This may be provided, for example, by means of several separated messages or by concatenation of the necessary information in message 42 of FIG. 4.

Figure 5:
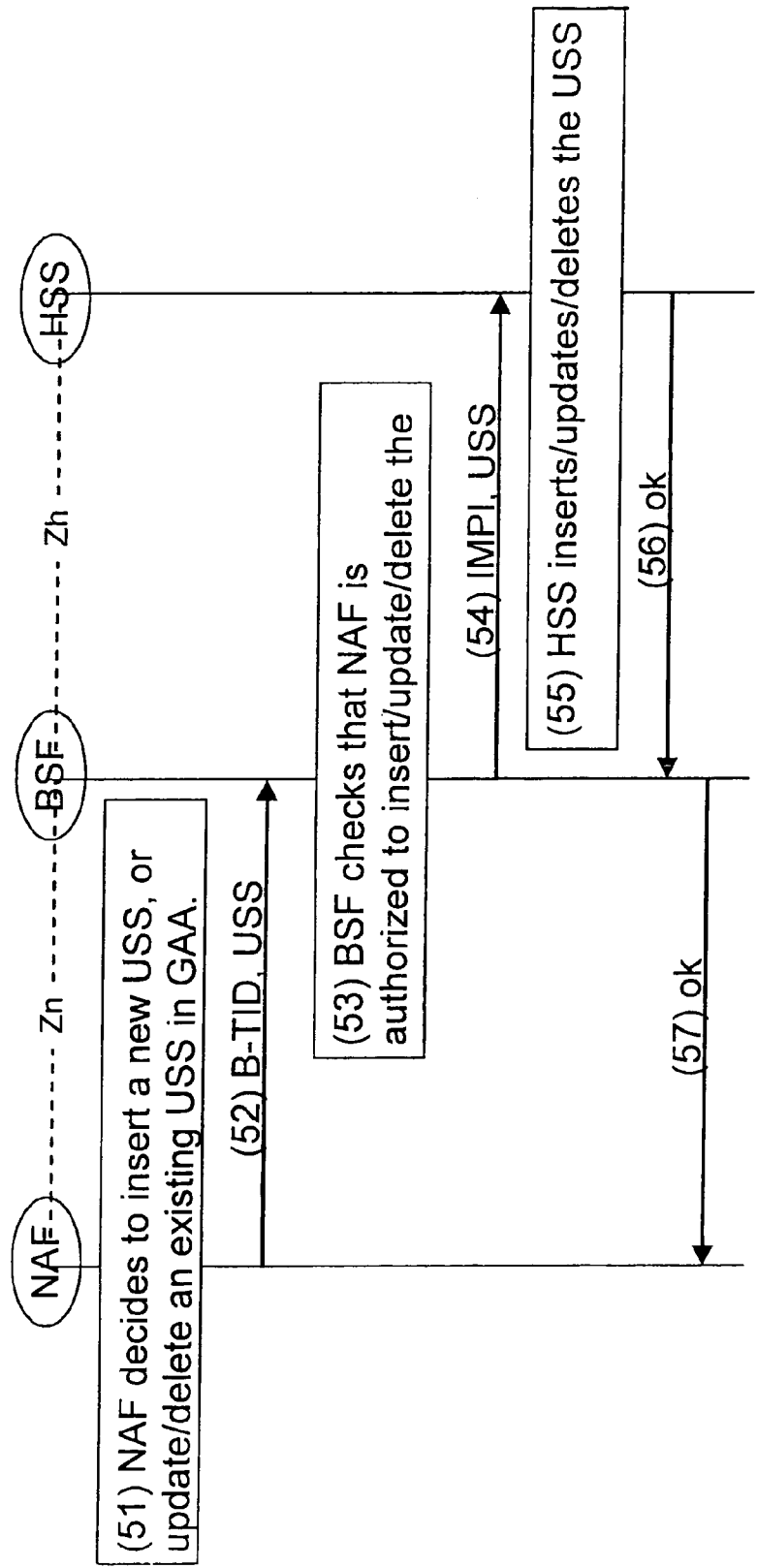

In another scenario the management of the subscriber database may occur synchronously through a BSF over appropriate interfaces. FIG. 5 shows a chart depicting messaging details related to insert, update and delete procedures where the messaging between a NAF through a BSF and a HSS is synchronous.

An USS insert operation will be described first. As above, it is assumed that the NAF has fetched required parameters from the BSF using the B-TID, and the user equipment and the NAF have completed the authentication between themselves or that the NAF has received the authentication information. However, it may occur that the NAF has not received an USS from the BSF, or the received USS was empty meaning that the user has not used the service before. In response to detection of this situation, the NAF may create a new service specific USS for the subscriber and populate the data fields with subscriber specific data in step 51. The USS may contain a pseudonym created by the NAF and other service specific data required by the service specific USS. The NAF may create the USS not only for the service requested by the user, but also for other services. For example, a visiting network may also create a USS for similar services. The NAF may then send the B-TID, and the new USS to the BSF over Zn interface at step 52. The NAF may also insert additional B-TIDs and USS for other services in the same message. The BSF then checks at step 53 that the NAF is authorized to insert the new USS to subscriber's GUSS. If the NAF is not authorized, the BSF may return an ERROR message to the NAF. If the NAF is authorized to insert the new USSs to subscriber's GUSS, the IMPI and the new USSs are sent to the HSS at step 54. The HSS may then insert the USSs to subscriber's GUSS identified by the IMPI at step 55. Upon successful insert operation, the HSS returns OK message at step 56 to the BSF. If the insert operation was not successful, an ERROR message may be sent to the BSF, or other appropriate action may follow. The BSF may then send at step 58 either OK or ERROR message to the NAF depending on the message received in step 57.

Other management procedures such as update and delete may be provided accordingly. Again the rights of the NAF to perform the management of the USS might vary between the different actions.

In the synchronous scenario each modification procedure on a subscriber's GUSS may trigger the BSF to contact the HSS. This may not always be desirable. Fore example, multiple NAFs may modify subscriber's GUSS during a bootstrapping session, and this may cause the BSF to contact the HSS multiple times. Thus the asynchronous approach may in certain applications be more appropriate.

Various other alternatives may also be provided for the management of the subscriber data. For example, a service specific user data may be inserted into, updated or deleted in the user database by a network application function directly via an existing interface or via new interface. An example of this interface is shown by a dashed line in FIG. 2. For example, a Sh interface or extension of it or a new GAA specific interface may be used for direct control between a network application function and a home subscriber server.

The direct management approach may be simpler and may require less or no changes in other interfaces. However, the access control for the network application function to insert, update, and delete a particular service specific user data may then need to be implemented in the user database, for example in the home subscriber server. Also, the Sh interface communication that does not utilize GAA may need to be able to handle the managing messages. This may not be always desired. Also, a BSF may already be provided with an access control functionality for the delivery USSs for different NAFs. Handling of the access control for user data insert/update/delete procedures may thus be more appropriately handled in a GM specific BSF.

If the NAF is collocated with a Liberty Identity Provider (IdP), then a USS management procedure may relieve the HSS from the Identity Provider related management burden of the USS. Also, such a USS management procedure may allow operators to easily outsource the user registration to specific services. The IdP may act as a trusted party also for other services, for example fixed network services and manage the USS for these services also.

If there are several user databases such as home subscriber servers in an operator system, then the BSF may need to know which server to contact. This information may be provided, for example, by a Subscriber locator Function (SLF). The BSF may contact the SLF with the request for data and be then provisioned with necessary information or redirected to the right HSS that contains the corresponding user data. The interface between BSF and SLF may be, for example, a Dz or similar interface.

The above described operations may require data processing in the various entities. The data processing may be provided by means of one or more data processors. Appropriately adapted computer program code product may be used for implementing the embodiments, when loaded to a computer. The program code product for providing the operation may be stored on and provided by means of a carrier medium such as a carrier disc, card or tape. A possibility is to download the program code product via a data network. Implementation may be provided with appropriate software in a location server.

The above embodiments relate to use cases where user data of a user using a service application is modified, either during initial registration or afterwards. User data may be managed accordingly also when the user is not using the service, but modification of user data is desired.

It is noted that whilst in the above embodiments are described in relation to user equipment such as mobile stations, embodiments of the present invention are applicable to any other suitable type of user equipment.

It is also noted that even though the exemplifying communication system shown and described in more detail in this disclosure uses the terminology of the 3$^{rd}$ generation (3G) WCDMA (Wideband Code Division Multiple Access) networks, such as UMTS (Universal Mobile Telecommunications System) or CDMA2000 public land mobile networks (PLMN), embodiments of the proposed solution can be used in any communication system wherein advantage may be obtained by means of the embodiments of the invention. The invention is not limited to environments such as cellular mobile or WLAN systems either.

It is also noted that while the above describes exemplifying embodiments of the invention, there are several variations and modifications which may be made to the disclosed solution without departing from the scope of the present invention as defined in the appended claims.

The invention claimed is:

1. A method executed at a node comprising at least one processor, the method comprising:
    managing, by at least one of a plurality of network application functions of a cellular network, service specific user security settings stored in a first database included in a home subscriber server,
    wherein the managing of the service specific user security settings comprises a first phase and a second phase:
    the first phase operative over a duration of a bootstrapping temporary identifier, such that the at least one network application function modifies a second database of a bootstrapping function by performing at least one of an insertion, an update, and a deletion of an internal copy of the service specific user security settings in the second database, wherein the second database is at the bootstrapping function and is separate from the first database, and
    the second phase operative when the duration of the bootstrapping temporary identifier becomes invalid by at least one of expiry and replacement, such that the bootstrapping function updates the service specific user security settings in the first database with the modifications made during the first phase to the second database.

2. The method according to claim 1, wherein the update of the service specific user security settings in the first database comprises communicating data from the second database to the first database, wherein the communicating occurs in response to a predefined event.

3. The method according to claim 2, wherein the predefined event comprises an end of session between the at least one network application function and the user.

4. The method according to claim 1 further comprising authenticating the user in a bootstrapping function based on security keys.

5. The method according to claim 2, wherein the communicating data comprises communicating data on an interface directly connecting the at least one of a plurality network application functions and the first database.

6. The method according to claim 1, wherein the first database is managed by a main controller, and wherein the main controller comprises a network operator.

7. The method according to claim 1, wherein the managing is performed when the user starts using a new service application.

8. The method according to claim 1, comprising authenticating the user in a generic authentication architecture in accordance with specifications of the third generation partnership project.

9. The method according to claim 1, wherein the service specific user security settings comprise service specific user security settings of a generic bootstrapping architecture user security settings.

10. The method according to claim 1, comprising fetching information regarding the first database to be managed in a communications system comprising a plurality of first databases.

11. The method according to claim 10, comprising fetching said information from a subscriber locator function to a security management function.

12. The method according to claim 1, comprising managing, by the at least one of a plurality network application functions, service specific user security settings associated with an application.

13. A non-transitory computer-readable storage medium including code which when executed by at least one processor provides operations comprising:
    managing, by at least one of a plurality of network application functions of a cellular network, service specific user security settings stored in a first database included in a home subscriber server,
    wherein the managing of the service specific user security settings comprises a first phase and a second phase:
    the first phase operative over a duration of a bootstrapping temporary identifier, such that the at least one network application function modifies a second database of a bootstrapping function by performing at least one of an insertion, an update, and a deletion of an internal copy of the service specific user security settings in the second database, wherein the second database is at the bootstrapping function and is separate from the first database, and
    the second phase operative when the duration of the bootstrapping temporary identifier becomes invalid by at least one of expiry and replacement, such that the bootstrapping function updates the service specific user security settings in the first database with the modifications to the second database.

14. An apparatus, comprising:
    a manager configured to manage, using at least one of a plurality of network application functions of a cellular network, service specific user security settings stored in a first database included in a home subscriber server; and
    a modifying unit configured to modify service specific user security settings in a second database for modification of the first database,
    wherein the managing of the service specific user security settings comprises a first phase and a second phase:
    the first phase operative over a duration of a bootstrapping temporary identifier, such that the apparatus modifies a second database of a bootstrapping function by performing at least one of an insertion, an update, and a deletion of an internal copy of the service specific user security settings in the second database, wherein the second database is at the bootstrapping function and is separate from the first database, and
    the second phase operative when the duration of the bootstrapping temporary identifier becomes invalid by at least one of expiry and replacement, such that the bootstrapping function updates the service specific user security settings in the first database with the modifications made during the first phase to the second database, wherein the data is communicated between the apparatus and the bootstrapping function configured on at least a first processor, wherein the provider and the modifying unit are configured on at least a second processor, and wherein the security management function is configured to modify the service specific user security settings in the first database.

15. The apparatus according to claim 14, wherein the apparatus is provided with an interface directly connecting the apparatus and the first database.

16. The apparatus according to claim 14, wherein the manager is further configured to manage service specific user security settings stored in the first database when a user starts using a new application.

17. The apparatus according to claim 14, wherein the manager is configured to manage service specific user security settings associated with an application provided by another apparatus.

18. The apparatus according to claim 14, further comprising an authenticator configured to authenticate the user based on a generic authentication architecture in accordance with specifications of the third generation partnership project.

19. The apparatus according to claim 14, wherein the service specific user security settings comprise service specific user security settings of a generic bootstrapping architecture user security settings.

20. The apparatus according to claim 14 wherein the apparatus comprises a network application function.

21. An apparatus, comprising:
at least one processor configured to include at least the following:
an authenticator configured to generate at least one authentication parameter for authentication of a user to enable the user to use an application; and
a manager configured to manage, based on data received from at least one of a plurality of network application functions of a cellular network, service specific user security settings associated with the user and the application, the service specific user security settings stored in a first database;
a second database configured to store the service specific user security settings;
a modifying unit configured to modify the service specific user security settings in the first database;
wherein the managing of the service specific user security settings comprises a first phase and a second phase:
the first phase operative over a duration of a bootstrapping temporary identifier, such that the apparatus modifies the second database of a bootstrapping function by performing at least one of an insertion, an update, and a deletion of an internal copy of the service specific user security settings in the second database, wherein the second database is at the bootstrapping function and is separate from the first database, and
the second phase operative when the duration of the bootstrapping temporary identifier becomes invalid by at least one of expiry and replacement, such that the bootstrapping function updates the service specific user security settings in the first database with the modifications made during the first phase to the second database.

22. The apparatus according to claim 21, wherein the modifying unit is further configured to communicate, in response to a predefined event, data from the second database to the first database.

23. The apparatus according to claim 22, wherein the predefined event comprises the end of a session between the at least one of a plurality network application functions and the user.

24. The apparatus according to claim 21, wherein the authenticator is further configured to generate security keys.

25. The apparatus according to claim 21, wherein the manager is further configured to manage the service specific user security settings in response to detection that the user wants to use a new application.

26. The apparatus according to claim 21, wherein the authenticator is further configured to authenticate the user in a generic authentication architecture in accordance with specifications of the third generation partnership project.

27. The apparatus according to claim 21, wherein the service specific user security settings comprise service specific user security settings of a generic bootstrapping architecture user security settings.

28. The apparatus according to claim 21, further comprising a retriever configured to retrieve information regarding a user database to be managed.

29. The apparatus according to claim 28, wherein the retriever is further configured to retrieve said information from a subscriber locator function.

30. An apparatus, comprising:
a storage configured to store, at a first database of a home subscriber server, service specific user security settings associated with an authenticated user and an application provided by a network application function of a cellular network; and
a processor configured to allow, based on service specific user security settings communicated from the apparatus to a bootstrapping function, management of the service specific user security settings,
wherein the processor is further configured to receive modifications to the service specific user security settings from a second database of the bootstrapping function, wherein said data is originally modified by the bootstrapping function, and wherein the processor is further configured to modify said data in the first database based on the modifications received from the second database, and
wherein the management of the service specific user security settings comprises a first phase and a second phase:
the first phase operative over a duration of a bootstrapping temporary identifier, such that the network application function modifies the second database by performing at least one of an insertion, an update, and a deletion of an internal copy of the service specific user security settings in the second database, wherein the second database is at the bootstrapping function and is separate from the first database, and
the second phase operative when the duration of the bootstrapping temporary identifier becomes invalid by at least one of expiry and replacement, such that the bootstrapping function updates the service specific user security settings in the first database with the modifications made during the first phase to the second database.

31. The apparatus as claimed in claim 30, wherein the apparatus is configured to be utilized in one of a home subscriber server and a home location register.

32. A system, comprising:
an authenticator configured to authenticate a user to enable the user to use an application provided by an application entity comprising a network application function of a cellular network; and a manager configured to manage service specific user security settings stored in a first database of a home subscriber server, wherein the manager is further configured to modify the service specific user security settings in a second database of a security management entity comprising a bootstrapping function, wherein the manager is configured to manage the service specific user security settings in at least a first phase and a second phase, wherein the first phase is operative over a duration of a bootstrapping temporary identifier, such that at least one of the application entity and another entity are allowed to modify the service specific user security settings in the second database by performing at least one of an insertion, an update, and a deletion of an internal copy of the service specific user security settings in the second database, wherein the second database is at the bootstrapping function and is separate from the first database, and wherein the second phase is operative when the duration of the bootstrapping temporary identifier becomes invalid by at least one of expiry and replacement, such that the bootstrapping function updates the service specific user security settings in the database with modifications made during the first phase to the second database, wherein the authenticator, the manager, and the security management function comprise one or more processors.

33. A method executed at a node comprising at least one processor, the method comprising:

providing an application to an authenticated user; and managing, by an application entity comprising a network application function of a cellular network, service specific user security settings stored in a first database of a home subscriber server, wherein the managing of the service specific user security settings takes place in more than one phase, the more than one phase comprising:

a first phase operative over a duration of a bootstrapping temporary identifier, such that at least one of the application entity and another entity are allowed to modify the service specific user security settings in a second database of a security management entity by performing at least one of an insertion, an update, and a deletion of an internal copy of the service specific user security settings in the second database, the security management entity comprising a bootstrapping function, wherein the second database is at the bootstrapping function and is separate from the first database, and a second phase operative when the duration of the bootstrapping temporary identifier becomes invalid by at least one of expiry and replacement, such that the bootstrapping function updates the service specific user security settings in the database with the modifications to the service specific user security settings made during the first phase to the second database.

34. A method executed at a node comprising at least one processor, the method comprising:

authenticating a user; and managing, by a security management entity, service specific user security settings based on service specific user security settings received from an application entity comprising a network application function of a cellular network, the service specific user security settings stored in a first database, wherein the managing of the service specific user security settings in the first database comprises more than one phase, the more than one phase comprising:

a first phase operative over a duration of a bootstrapping temporary identifier, such that at least one of the application entity and another entity are allowed to modify the service specific user security settings in a second database of a bootstrapping function by performing at least one of an insertion, an update, and a deletion of an internal copy of the service specific user security settings in the second database, wherein the second database is at the bootstrapping function and is separate from the first database, and a second phase operative when the duration of the bootstrapping temporary identifier becomes invalid by at least one of expiry and replacement, such that the bootstrapping function updates the service specific user security settings in the database with the modifications made during the first phase to the second database.

35. A non-transitory computer-readable storage medium including code which when executed by at least one processor provides operations comprising:

providing an application to an authenticated user; and managing, by an application entity, service specific user security settings in a first database of a home subscriber server, wherein the application entity comprises a network application function of a cellular network, wherein the managing of the service specific user security settings comprises more than one phase, the more than one phase comprising:

a first phase operative over a duration of a bootstrapping temporary identifier, such that at least one of the application entity and another entity are allowed to modify the service specific user security settings in the second database of a bootstrapping function by performing at least one of an insertion, an update, and a deletion of an internal copy of the service specific user security settings in the second database, wherein the second database is at the bootstrapping function and is separate from the first database, and a second phase operative when the duration of the bootstrapping temporary identifier becomes invalid by at least one of expiry and replacement, such that the bootstrapping function updates the service specific user security settings in the first database with the modifications made during the first phase to the second database.

36. A non-transitory computer-readable storage medium including code which when executed by at least one processor provides operations comprising:

authenticating a user; and managing, by a security management entity, service specific user security settings stored in a first database of a home subscriber server, based on data received from an application entity, wherein the application entity comprises a network application function of a cellular network and the security management entity comprises a bootstrapping function, wherein the managing service specific user security settings further comprises modifying service specific user security settings in the first database, wherein the managing of the service specific user security settings comprises more than one phase, the more than one phase comprises:

a first phase operative over a duration of a bootstrapping temporary identifier, such that at least one of the application entity and another entity are allowed to modify the service specific user security settings in a second database of the security management entity by performing at least one of an insertion, an update, and a deletion of an internal copy of service specific user security settings in the second database, wherein the second database is at the bootstrapping function and is separate from the first database, and a second phase operative when the duration of the bootstrapping temporary identifier becomes invalid by at least one of expiry and replacement, such that the bootstrapping function updates the service specific user security settings in the database with the modifications made during the first phase to the second database.

* * * * *